United States Patent
Bhakta

(10) Patent No.: US 11,287,101 B2
(45) Date of Patent: *Mar. 29, 2022

(54) QUASI-SPARSE OPTICAL ILLUMINATION

(71) Applicant: TEXAS INSTRUMENTS INCORPORATED, Dallas, TX (US)

(72) Inventor: Vikrant R. Bhakta, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/829,079

(22) Filed: Mar. 25, 2020

(65) Prior Publication Data

US 2020/0224846 A1 Jul. 16, 2020

Related U.S. Application Data

(63) Continuation of application No. 16/248,513, filed on Jan. 15, 2019, which is a continuation of application
(Continued)

(51) Int. Cl.
*F21S 41/675* (2018.01)
*F21S 41/20* (2018.01)
(Continued)

(52) U.S. Cl.
CPC ............ *F21S 41/675* (2018.01); *B60Q 1/076* (2013.01); *B60Q 1/14* (2013.01); *F21S 41/25* (2018.01);
(Continued)

(58) Field of Classification Search
CPC ........ F21S 41/675; F21S 41/25; F21S 41/365; F21S 41/36; F21S 41/285; F21S 41/176; F21S 41/141; F21S 48/125; F21S 48/1388; B60Q 1/076; B60Q 1/14; B60Q 1/12; B60Q 2300/45; B60Q 1/08; B60Q 1/085
(Continued)

(56) References Cited

U.S. PATENT DOCUMENTS

| 10,180,224 B2 | 1/2019 | Bhakta |
| 10,634,304 B2 * | 4/2020 | Bhakta ..................... B60Q 1/14 |

(Continued)

FOREIGN PATENT DOCUMENTS

| FR | 3008477 A1 | 1/2015 |
| RU | 2005124469 A | 8/2007 |

(Continued)

*Primary Examiner* — Laura K Tso
(74) *Attorney, Agent, or Firm* — Michelle F. Murray; Charles A. Brill; Frank D. Cimino

(57) ABSTRACT

In described examples, a DMD includes micromirrors. A first light source generates a first beam profile illuminating a first set of micromirrors of the DMD. A second light source generates a second beam profile illuminating a second set of micromirrors of the DMD. The first and second beam profiles partially overlap on at least some micromirrors of the DMD. The first light source is source-modulated independently of the second light source for adjusting power and brightness in response to a sensed driving condition. The micromirrors of the DMD are modulated in response to the sensed driving condition.

19 Claims, 13 Drawing Sheets

Related U.S. Application Data

No. 15/659,600, filed on Jul. 25, 2017, now Pat. No. 10,180,224.

(60) Provisional application No. 62/366,922, filed on Jul. 26, 2016.

(51) Int. Cl.

| | | |
|---|---|---|
| *F21S 41/365* | (2018.01) | |
| *F21S 41/25* | (2018.01) | |
| *F21S 41/36* | (2018.01) | |
| *B60Q 1/076* | (2006.01) | |
| *B60Q 1/14* | (2006.01) | |
| *B60Q 1/12* | (2006.01) | |
| *F21S 41/141* | (2018.01) | |
| *F21S 41/176* | (2018.01) | |

(52) U.S. Cl.
CPC .............. *F21S 41/285* (2018.01); *F21S 41/36* (2018.01); *F21S 41/365* (2018.01); *B60Q 1/12* (2013.01); *B60Q 2300/45* (2013.01); *F21S 41/141* (2018.01); *F21S 41/176* (2018.01)

(58) Field of Classification Search
USPC .......................................................... 362/465
See application file for complete search history.

(56) References Cited

U.S. PATENT DOCUMENTS

| | | | |
|---|---|---|---|
| 2005/0174771 A1 | 8/2005 | Conner | |
| 2012/0106178 A1 | 5/2012 | Takahashi et al. | |
| 2015/0092435 A1* | 4/2015 | Yamamura | F21S 41/365 362/512 |
| 2015/0160454 A1 | 6/2015 | Bhakta | |
| 2015/0211703 A1* | 7/2015 | Nakazawa | B60Q 1/085 362/514 |
| 2015/0316234 A1 | 11/2015 | Samonji et al. | |
| 2015/0377446 A1 | 12/2015 | Bhakta | |
| 2016/0039333 A1* | 2/2016 | Shyu | F21S 41/675 362/509 |
| 2016/0152174 A1* | 6/2016 | Hagisato | B60Q 1/1438 362/466 |
| 2016/0176335 A1* | 6/2016 | Hoshino | B60Q 1/143 362/466 |
| 2016/0368413 A1* | 12/2016 | Nishii | B60Q 1/085 |
| 2016/0377252 A1 | 12/2016 | Bhakta | |
| 2017/0138555 A1 | 5/2017 | Hirasawa et al. | |

FOREIGN PATENT DOCUMENTS

| | | |
|---|---|---|
| WO | 2011016892 A2 | 2/2011 |
| WO | 2011079323 A2 | 6/2011 |
| WO | 2017036871 A1 | 3/2017 |

\* cited by examiner

QUASI-SPARSE OPTICAL ILLUMINATION

CROSS-REFERENCE TO RELATED APPLICATION

This application is a continuation of U.S. patent application Ser. No. 16/248,513, filed Jan. 15, 2019, which is also a continuation of U.S. patent application Ser. No. 15/659,600, filed Jul. 25, 2017, which claims the benefit of U.S. Provisional Patent Application No. 62/366,922, filed Jul. 26, 2016, which applications are hereby incorporated herein by reference in their entireties.

BACKGROUND

In some lighting systems, light for projection is sourced by emission of light from a lamp or laser. The emitted light is often reflected and focused upon for projection for illuminating a specific area. The emitted light can have a white-correlated ("white") color temperature, so a white light is projected for illumination, such as illumination of a dark road when driving a vehicle. Some vehicles mechanically couple the steering wheel to a headlight assembly, so the projected light is redirected from straight ahead (e.g., perpendicular the vehicle's front) to either a left or right orientation, according to a direction in which the vehicle is turning. However, such systems are often cumbersome and require sufficient area to pivot an entire headlight assembly. Also, additional calibration procedures and/or operational power can be needed for proper operation of the steerable headlight assemblies.

SUMMARY

In described examples, a DMD includes micromirrors. A first light source generates a first beam profile illuminating a first set of micromirrors of the DMD. A second light source generates a second beam profile illuminating a second set of micromirrors of the DMD. The first and second beam profiles partially overlap on at least some micromirrors of the DMD. The first light source is source-modulated independently of the second light source for adjusting power and brightness in response to a sensed driving condition. The micromirrors of the DMD are modulated in response to the sensed driving condition.

DETAILED DESCRIPTION

Figure 1:
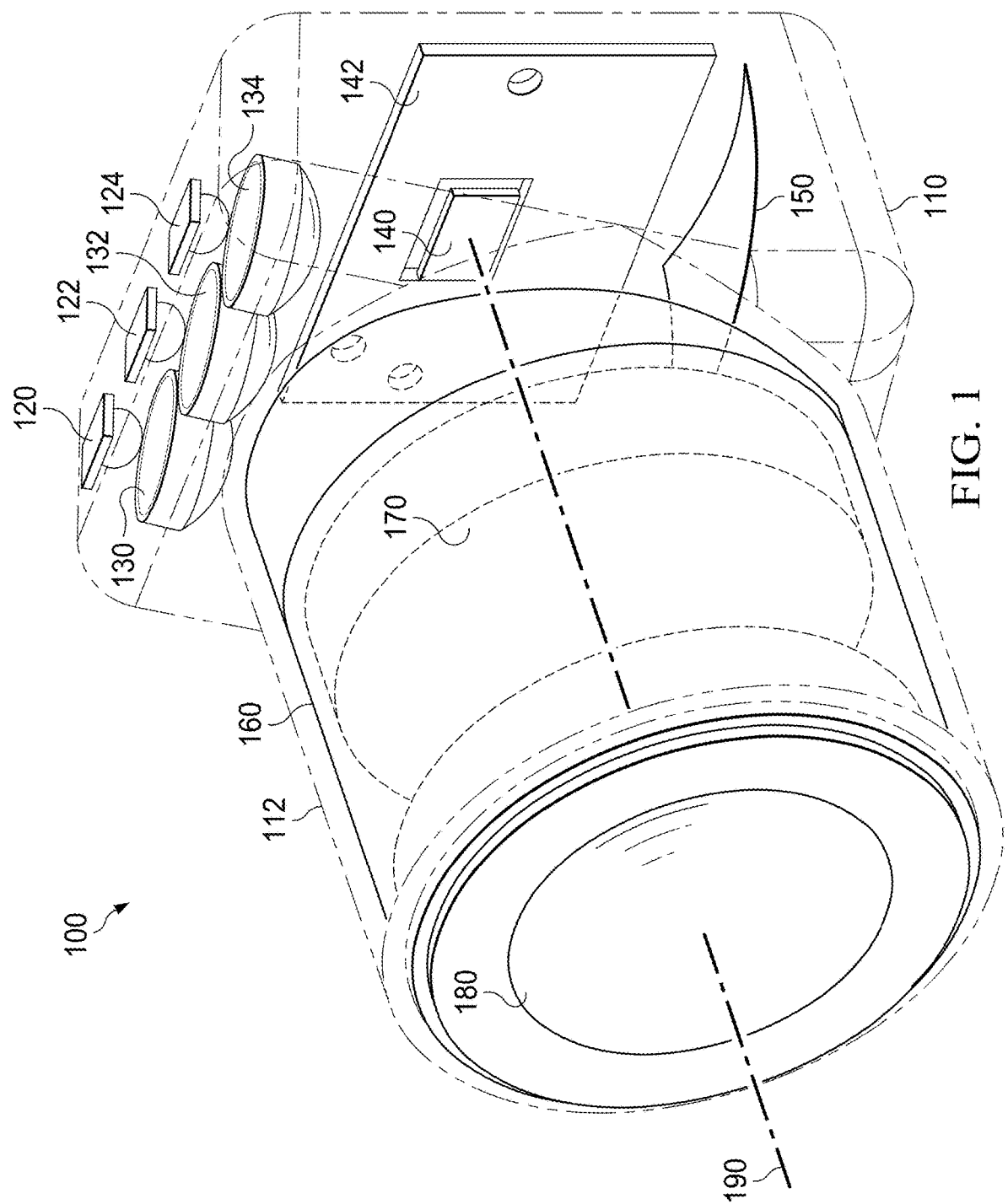
FIG. 1 is an orthographic view of a headlight assembly for beam steering with quasi-sparse illumination.

In this description: (a) the term "portion" can include an entire portion or a portion that is less than the entire portion; (b) the term "package" can include a substrate or a sealed container, such as die, wafers or micromechanical devices in a local environment that is sealed from an outside environment; (c) the term "sparse" can include partially illuminated areas of a pupil (e.g., irradiated area); and (d) the term "optical elements" can include lenses, mirrors or both.

In many illumination systems, a locally generated beam of light is parabolically reflected and focused through a lens, so a specific area is illuminated. In many vehicles, a headlight assembly includes a lamp, large-scale parabolic reflectors and lenses. The headlight assembly is locally pivoted (e.g., with respect to a vehicle chassis) in response to a controlling movement of the steering wheel of the vehicle. For example, mechanical linkages and/or headlight assembly motors can pivot the headlight assembly in response to normal rotational movement of the steering wheel, so the beam of light can be directed with a greater degree of freedom as compared to highlights mounted in a fixed position and orientation relative to the chassis of the vehicle.

In contrast, example embodiments include a digital micromirror device ("DMD") and controllable light sources for steering a light beam independently of the orientation of the headlight assembly including the DMD. For example, the light beam can be steered in response to an indication of a degree of rotation of a vehicle steering wheel. Independently steerable individual micromirrors can be dynamically oriented in response to rotation of the steering wheel. Further, the brightness (e.g., luminance) of controllable light sources for illuminating the DMD can be individually controlled (e.g., adjusted), so power can be conserved by reducing the brightness of the light beam for a selected azimuth.

In example embodiments, individually controlled lamps are arranged to selectively illuminate partially overlapping portions of an optically active portion of a DMD (e.g., in quasi-sparse illumination). In quasi-sparse illumination, portions of scenes illuminated by light reflected from the DMD are selectively more brightly illuminated than other portions (e.g., by focusing of light from different light sources). Accordingly, the partial overlap can be determined in the spatial domain and the angular domain. For example, the individually controlled light sources can be independently controlled by regulating (e.g., on, off, or various levels there between) the power applied to corresponding light sources. Accordingly, independently controlling a respective light source can save power (and reduce heat dissipation) by reducing illumination to a specific DMD area (e.g., which would otherwise be projected to non-road surface area).

In example embodiments, the micromirrors can be rapidly switched ON or OFF to shape the beam of light in response to one or more indications of driving conditions. For example, the indications can be separately or collectively generated by a predictive algorithm based on global positioning system (GPS) data and information from sensors in a vehicle (such as LiDAR, radar, cameras and inter-vehicle safety systems). The headlight beam shaping can include applications such as steering a headlight beam downwards to deliver higher peak luminance to a road surface when an on-coming vehicle is detected, mapping a predicted vehicle path to deliver higher peak luminance following a yet-to-be-driven-upon road curve and averting the headlight beam from an illumination pattern likely to "blind" the vision of the operator of an on-coming vehicle. The beam steering with mutually independently modulated light sources (e.g., for selective multi-axial beam steering) can conserve power and increase safety for the vehicle, the on-coming vehicles, pedestrians and other beings or objects.

In example embodiments, one or more of the individually controlled light sources is/are arranged to emit light for projecting towards a concave mirror for reflectively illuminating selected portions of a DMD. For example, one or more of the individually controlled lamps illuminate(s) different but overlapping portions of the concave mirror, so different (but generally overlapping) optically active portions of the DMD are illuminated. Such arrangements facilitate a compact arrangement of components because the individually controlled lamps can be arranged to be closer to the DMD. The compact arrangement can be used to reduce cost, complexity and space requirements of a headlight assembly.

FIG. 1 is an orthographic view of a headlight assembly for beam steering with quasi-sparse illumination. The headlight assembly 100 generally includes a headlight assembly casing 110 (including lens casing 112), light sources 120, 122 and 124, light source lenses 130, 132 and 134, a DMD 140 (affixed to package/substrate 142), a concave mirror 150, an optional asymmetric aperture 160 and a projection lens (170 and 180) including for focusing collimated light for projection with respect to an axis 190 (e.g., centered or biased to the left or right and/or upwards or downward of axis 190 as shown in FIG. 1).

The light sources 120, 122 and 124 can be mutually independently controllable lamps such as incandescent light bulbs, halogen or xenon lamps, light-emitting diode (LED) arrays and/or laser diodes (e.g., for exciting a phosphor surface for emission of light of a selected frequency). The light sources 120, 122 and 124 can be formed in separate substrates or the same substrate in which various light-emitting portions thereof can be individually and selectively controlled. The light sources 120, 122 and 124 are usually the same color (e.g., white for highway headlight applications), but some applications can include lamps of mutually different colors and/or color temperatures for additive (or subtractive) color synthesis in varying applications. While three light sources are described, various embodiments include as many as 100 or more independently controlled light sources for achieving finer source modulation for more finely controlled beam steering.

Figure 2A:
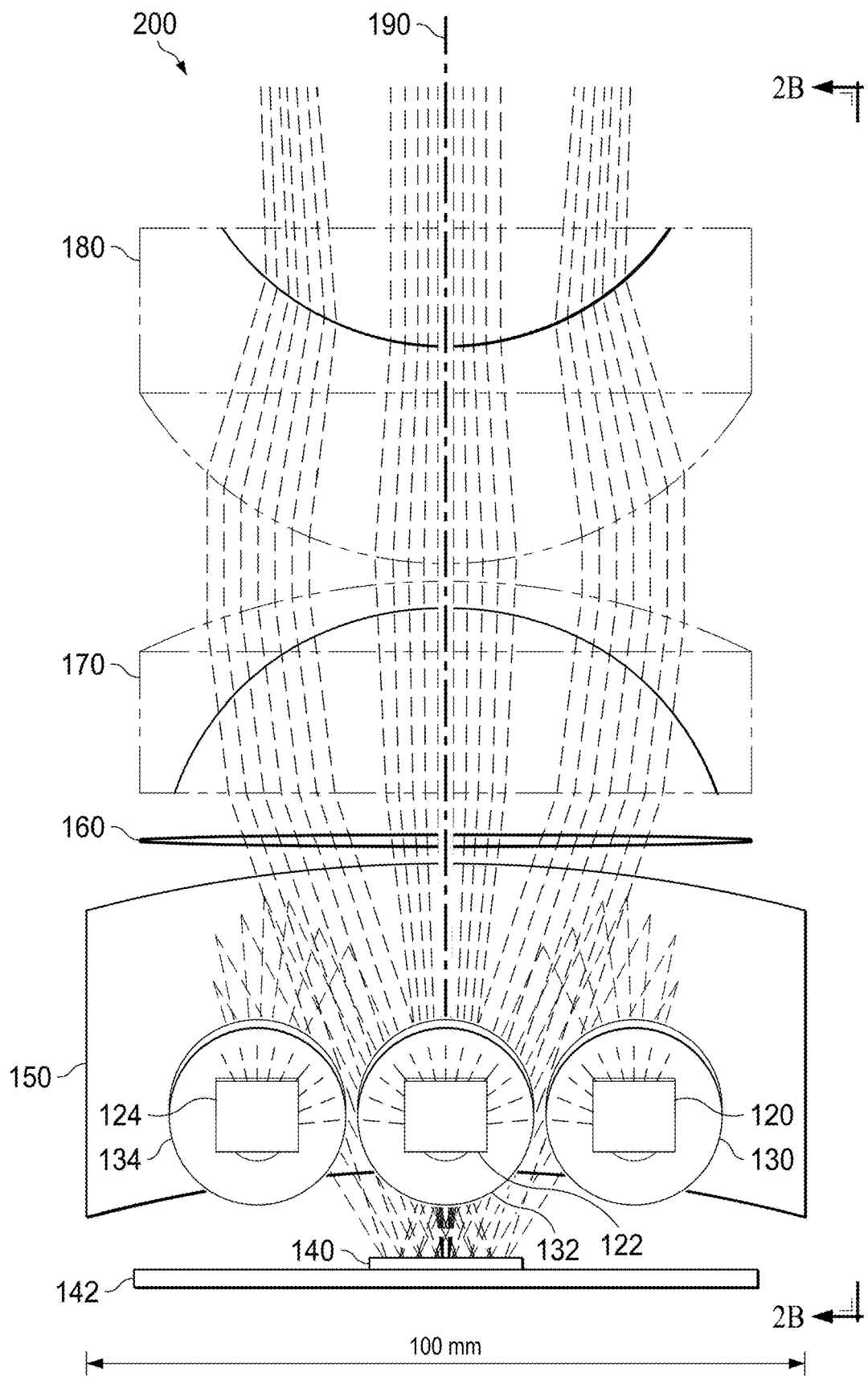
FIG. 2A is a top view of a headlight assembly for beam steering with quasi-sparse illumination.
Figure 2B:
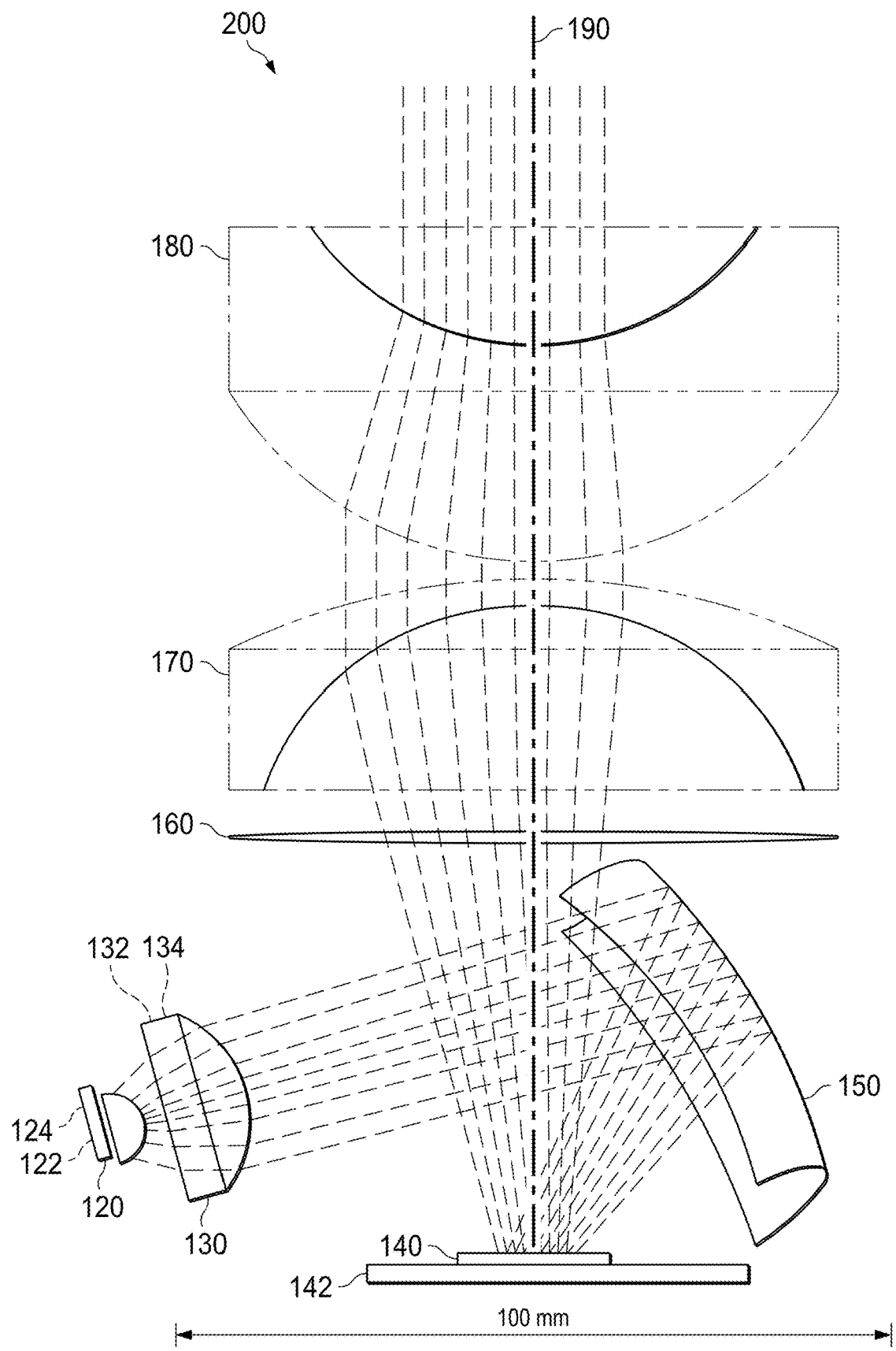
FIG. 2B is a side view of a headlight assembly for beam steering with quasi-sparse illumination.

The light sources 120, 122 and 124 are arranged to produce light for directional focusing by light source lenses 130, 132 and 134. Each of the light source lenses 130, 132 and 134 includes a concave surface for refracting incident light from a respective one of the light sources 120, 122 and 124 into generally parallel (e.g., collimated) light rays directed: (a) towards the DMD 140 directly; or (b) as shown in FIGS. 2A and 2B, towards the DMD 140 via the concave mirror 150.

The concave mirror 150 is usually a complex geometric shape (e.g., an interior biconic surface) including a reflective surface curved (e.g., folded) inwards, so incident light is reflected into converging rays for collection on the optically active surface of the DMD 140. The shape of the mirror is arranged for focusing light from each of the light sources 120, 122 and 124. Each light source is associated with (e.g., arranged to illuminate) a respective set of micromirrors. Because the respective sets of micromirrors are partially overlapping, a respective set can share some micromirrors with another one of the respective sets.

Figure 3:
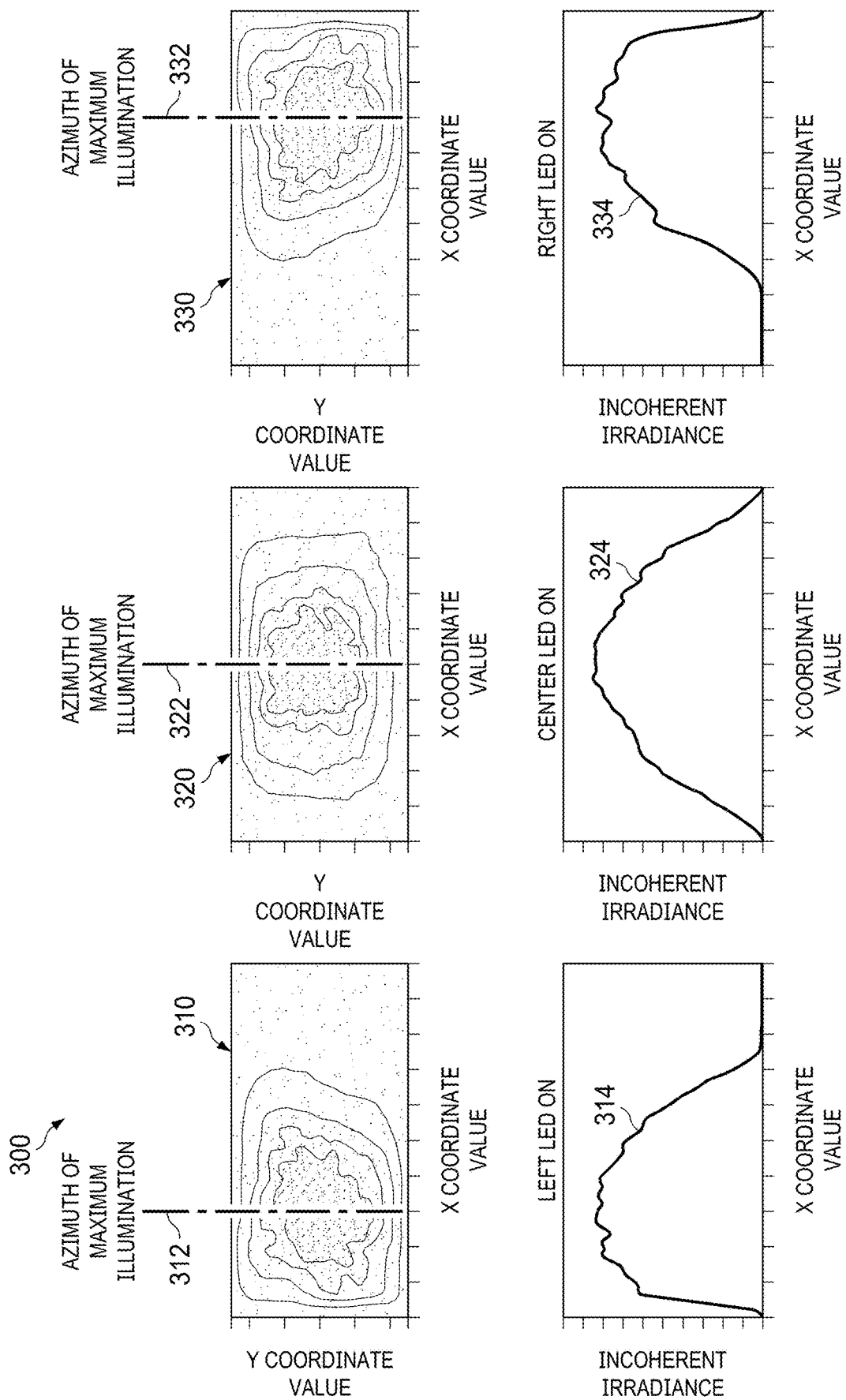
FIG. 3 is a group of graphs showing irradiance plots of DMD optically active surfaces for source-modulated beam steering with quasi-sparse illumination.

The shape of the mirror and the arrangement of the light sources 120, 122 and 124 are arranged to generally illuminate the whole of the optically active surface of the DMD 140, or to more brightly illuminate specific portions (such as a center-to-left portion or a center-to-right portion) of the optically active surface of the DMD 140 (e.g., see FIG. 3). The relative degrees of illumination of the portions optically active surface of the DMD 140 can be controlled by individually controlling the amount of light (e.g., luminance) generated by each of the light sources 120, 122 and 124. The light from selected light sources 120, 122 and 124 are optically coupled to illumination optics for generating partially overlapping beam profiles in the spatial and angular domains. The partially overlapping beam profiles create a sparsely filled (e.g., sparsely illuminated) pupil, so light reflected from selected portions of the optically active surface of the DMD 140 illuminates portions of a scene based on a selected azimuth (e.g., selected by a predictive azimuth). The partially overlapping beam profiles also generate a brightness greater than a brightness generated by a single light source.

In an embodiment, the DMD 140 includes a bi-dimensional array of reflective elements (e.g., micromirrors) arranged in rows and columns, where each such reflective element controls illumination with respect to a "pixel" (e.g., a micromirror for individually controlling a particular portion of the focused light beam for projection). The reflective elements selectively control the angle and location at which the focused light beam encounters the back (e.g., DMD-side) surface of the projection lens 180.

The reflective elements of the DMD 140 are individually responsive to a processor (e.g., see FIG. 11) for optically steering the projected beam. The projected beam can also be steered by individually controlling the degree of brightness of the individual light sources 120, 122 and 124. Accordingly, the projected beam can be steered by individually controlling the degree of brightness of the individual light sources 120, 122 and 124 and/or controlling individual micromirrors (collectively or individually). When the brightness of an individual light source 120, 122 and 124 is adjusted (e.g., reduced), power is conserved.

In embodiments including one-axis micromirrors, each pixel can be steered left and right, so the beam from a particular micromirror can be entirely directed away from the projection optics (e.g., projection lens 180 and into a light trap, so the beam from the particular micromirror is not projected) or to a selected location on the projection lens 180 (e.g., so the beam from the particular micromirror can be projected to the left, the center or the left of the axis of projection 190).

The pixel rays reflected by the DMD 140 are internally projected through an optional asymmetric aperture 160 for controlling the brightness and the contrast ratio of the total projected light. Generally, with narrowed apertures, the contrast ratio of illuminated subjects is increased and the overall brightness is decreased. With wider apertures, the contrast ratio is decreased and the overall brightness is increased (e.g., see FIG. 4).

The pixel rays reflected by the DMD 140 are projected in a cone which can be steered horizontally or vertically with respect to the axis of projection 190 (e.g., without repositioning or reorienting any lenses). The projected pixel rays reflected by the DMD 140 can be projected in response to various combinations of driving conditions, predictive algorithms and mutually independent modulation of light sources in conjunction with DMD modulation of mirrors (e.g., for pedestrian masking).

Example embodiments of the headlight assembly 100 are described hereinbelow in connection with a top-view section (FIG. 2A) and a side-view section (FIG. 2B).

FIG. 2A is a top view of a headlight assembly for beam steering with quasi-sparse illumination. The headlight assembly 200 is a headlight assembly such as the headlight assembly 100 and generally includes the headlight light sources 120, 122 and 124, a light source lenses 130, 132 and 134, a DMD 140 (affixed to substrate 142), a concave mirror 150, an optional asymmetric aperture 160, a and a projection lens 170 and 180 for focusing collimated light for projection with respect to an axis 190 (e.g., centered or biased to the left or right and/or upwards or downward of axis 190 as shown in FIG. 1).

As described hereinabove, the light source 120, 122 and 124 are lamps that are source-modulated independently of one another. The light sources 120, 122 and 124 are arranged to produce light for directional focusing by light source lenses 130, 132 and 134 towards the DMD 140 via the biconic mirror 150. As described hereinbelow in connection with FIG. 3, the light sources 120, 122 and 124 are arranged to produce light (in conjunction with the operation of concave mirror 150), so the DMD is generally uniformly illuminated with partially overlapping beam patterns from the respective light sources. In the example of FIG. 2A, the contribution to steering the projected beam by source-modulating the light sources 120, 122 and 124 (independently of one another) is relatively minimal as the projected light beam (as shown in cross section exiting the projection lens 180) is centered about the axis of projection 190.

FIG. 2B is a side view of a headlight assembly for beam steering with quasi-sparse illumination. The headlight assembly 200 is a headlight assembly such as the headlight assembly 100 and generally includes the light sources 120, 122 and 124, a light source lenses 130, 132 and 134, a DMD 140 (affixed to substrate 142), a concave mirror 150, an optional asymmetric aperture 160, a projection lens 170 and 180 for focusing collimated light for projection with respect to an axis 190.

As described hereinabove, each pixel ray of the DMD 140 can be steered left and right or up and down, so the beam from a particular micromirror can be entirely directed away from the projection lens 180 or to a selected location on the projection lens 190. For example, a "digital" DMD mirror can be in one of the two states ON (+12 degrees) and OFF (−12 degrees): accordingly, beams can be steered along a left-right axis or an up-down axis depending upon the orientation of the DMD device.

FIG. 3 is a group of graphs showing irradiance plots of DMD optically active surfaces for source-modulated beam steering with quasi-sparse illumination. For example, the surface of a DMD (such as DMD 140) includes illuminated surfaces 310, 320 and 330, which show contributions of the respective light sources (e.g., 120, 122 and 124) to illuminate those surfaces 310, 320 and 330. Left, center and right graphs 300 include a respective azimuth for indicating a center-point (e.g., one-dimensional center-point) of irradiance contributed by the respective light source.

In an embodiment, the DMD can be a large-scale DMD, so multiple white LEDs can be arranged to provide sufficient etendue for a target application, such as the brightness required by vehicle headlights on public roads. The DMD includes an aspect ratio of 2:1, which facilitates a side-by-side arrangement of LEDs to provide sufficient illumination (etendue) for achieving a high peak illuminance at an acceptable field of view for projection as a headlight beam.

In an embodiment, a quasi-sparse illumination architecture includes contribution of partially overlapping light beam from separately controllable LEDs for generating a high peak luminance near the center of the DMD. Quasi-sparse illumination-based beam steering can be achieved by changing each partially overlapped beam's contribution by changing a respective input current to an individual LED. Accordingly: the average power consumption can be reduced by over 20 percent when driving in diverse road conditions; the thermal load in the headlight assembly can be reduced; the LED life-time can be increased (and reliability increased); and yellowing artifacts at the edge of the field of view of the beam can be reduced.

Quasi-sparse illumination-based beam steering can be achieved by changing contribution of left, center and right partially overlapped beams by changing a respective input current to an individual LED. For example, illuminated surface 310 includes an illuminated spot centered under azimuth 312. Curve 314 shows the degree of illumination of a horizontal line in the center of the illuminated surfaces 310 extending from left to right. The azimuth 312 is associated with a center point on the curve 314 at which the area under the curve 314 to the left of the center point is equal to the area under the curve 314 to the right of the center point.

The illuminated surface 320 includes an illuminated spot centered under azimuth 322. Curve 324 shows the degree of illumination of a horizontal line in the center of the illuminated surfaces 320 extending from left to right. The azimuth 322 is associated with a center point on the curve 324 at which the area under the curve 324 to the left of the center point is equal to the area under the curve 324 to the right of the center point.

The illuminated surface 320 includes an illuminated spot centered under azimuth 322. Curve 324 shows the degree of illumination of a horizontal line in the center of the illuminated surfaces 320 extending from left to right. The azimuth 322 is associated with a center point on the curve 324 at which the area under the curve 324 to the left of the center point is equal to the area under the curve 324 to the right of the center point The illuminated surface 330 includes an illuminated spot centered under azimuth 332. Curve 334 shows the degree of illumination of a horizontal line in the center of the illuminated surfaces 330 extending from left to right. The azimuth 332 is associated with a center point on the curve 334 at which the area under the curve 334 to the left of the center point is equal to the area under the curve 334 to the right of the center point.

Accordingly, activating the left, center and right LEDs uniformly illuminates the DMD, activating the left and center LEDs illuminates the left and center portions of the DMD, and activating the center and right LEDs illuminates the center and right portions of the DMD. The projected beam is steered in accordance with the illuminated portions of the DMD.

Figure 4A:
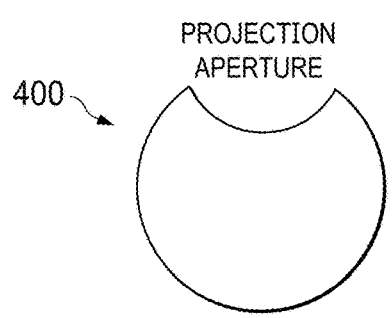
FIG. 4A is a diagram of an inner margin of a first projection aperture.

FIG. 4A is a diagram of an inner margin of a first projection aperture. The projection aperture 400 is similar to aperture 160 and is generally circular and is narrowed along one side. For example, the aperture shape can be narrowed by drawing a chord through two points of the circle, and folding an arc (e.g., the smaller arc) defined by the chord inwards. With a narrowed aperture, the contrast ratio is increased and the overall brightness is decreased. The asymmetric inner margin of the aperture 400 masks an outward portion of the cone (or pyramid) of the focused light along the projection axis, so the contrast of objects illuminated by the partially masked beam is increased (e.g., which can increase the likelihood that a driver would more quickly notice and identify the illuminated objects).

Figure 4C:
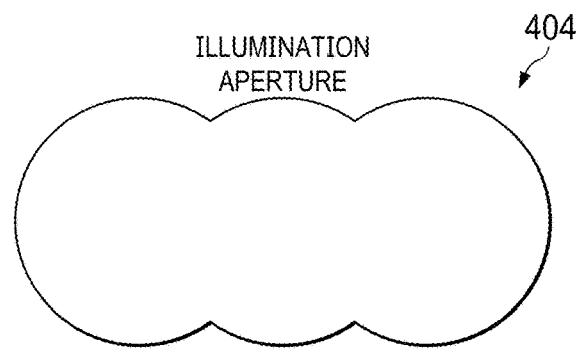
FIG. 4C is a diagram of an inner margin of an illumination aperture.
Figure 4B:
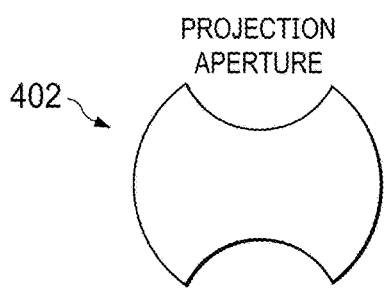
FIG. 4B is a diagram of an inner margin of a second projection aperture.

FIG. 4B is a diagram of an inner margin of a second projection aperture. The projection aperture 402 is similar to aperture 160 and is generally circular and is narrowed on opposing sides. For example, the aperture shape can be narrowed by drawing a chord through two points on a first side of the circle, and folding an arc (e.g., the smaller arc) defined by the chord inwards. The aperture shape can be further narrowed by drawing a second chord through two points on an opposite side of the circle, and folding an arc (e.g., the smaller arc) defined by the chord inwards. The doubly asymmetric inner margin of the aperture 402 masks an outward portion of the cone of the focused light along the projection axis, so the contrast of objects illuminated by the partially masked beam is increased (e.g., more than the contrast ratio of the aperture 400).

FIG. 4C is a diagram of an inner margin of an illumination aperture. The projection aperture 404 is for masking light from light sources (e.g., 120, 122 and 124) and for shaping the contours of incident light impinging the DMD. Accordingly, the projection aperture 404 is arranged in a convenient location in the light path between the light sources (e.g., 120, 122 and 124) and the DMD.

For example, the aperture 404 shape (e.g., the outline of inner margin) can be defined as the outer boundaries of three circles of which two circles overlap a center circle. In an embodiment, the center of each circle is collinear (e.g., in a straight line) with the centers of the overlapping circles forming the inner margin of the aperture 404. In an embodiment, a circle for defining the aperture 404 inner margin is defined in accordance with a relative position of a corresponding light source circle (e.g., two, three, four, five or more circles) to define the shape of the inner margin of the projection aperture 404.

The asymmetric inner margin of the aperture 404 masks an outward portion of the cone of the focused light. Masking the outward portion of the cone of the light focused on the DMD increases the contrast ratio of the projected beam. The outline of the masked cone of the light illuminating the DMD approximates the aspect ratio and the outline of the optically active surface of the DMD.

Figure 4D:
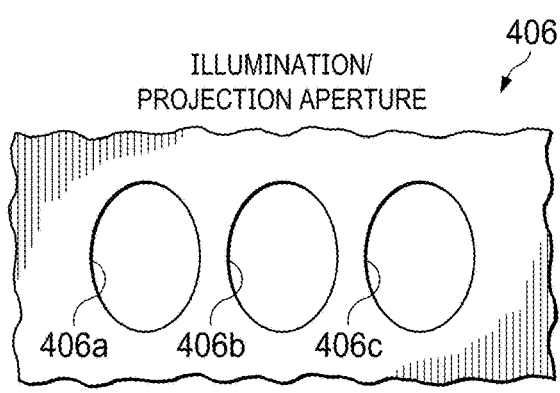
FIG. 4D is a diagram of an illumination and/or projection aperture.

FIG. 4D is a diagram of an illumination and/or projection aperture. When arranged as an illumination aperture, the aperture 404 can be located in a convenient location in the light path between the light sources (e.g., 120, 122 and 124) and the DMD 140 (e.g., where the aperture 406a is for masking the light source 120, the aperture 406b is for masking the light source 122, and the aperture 406c is for masking the light source 124). When arranged as a projection aperture, the aperture 404 can be located in a convenient location in the light path between the DMD and the projection lens 170 and 180 elements.

For example, the aperture 406 shape (e.g., the outline of inner margins) can be defined as the outer boundaries of three non-overlapping ellipses. In an embodiment, the center of each ellipse is collinear (e.g., in a straight line) with the short axes of each of the three ellipses of the aperture 406. In an embodiment, a circle for defining the aperture 406 inner margins is defined in accordance with a relative position of a corresponding light source ellipse (e.g., two, three, four, five or more ellipses) to define the shape of the inner margin of the aperture 404.

The asymmetric inner margin of the aperture 406 masks portions of the cone of the focused light. Masking the portions of the cone of the light focused on the DMD increases the contrast ratio of the projected beam. The outline of the masked cone of the light illuminating the DMD approximates the aspect ratio and the outline of the optically active surface of the DMD.

Figure 5A:
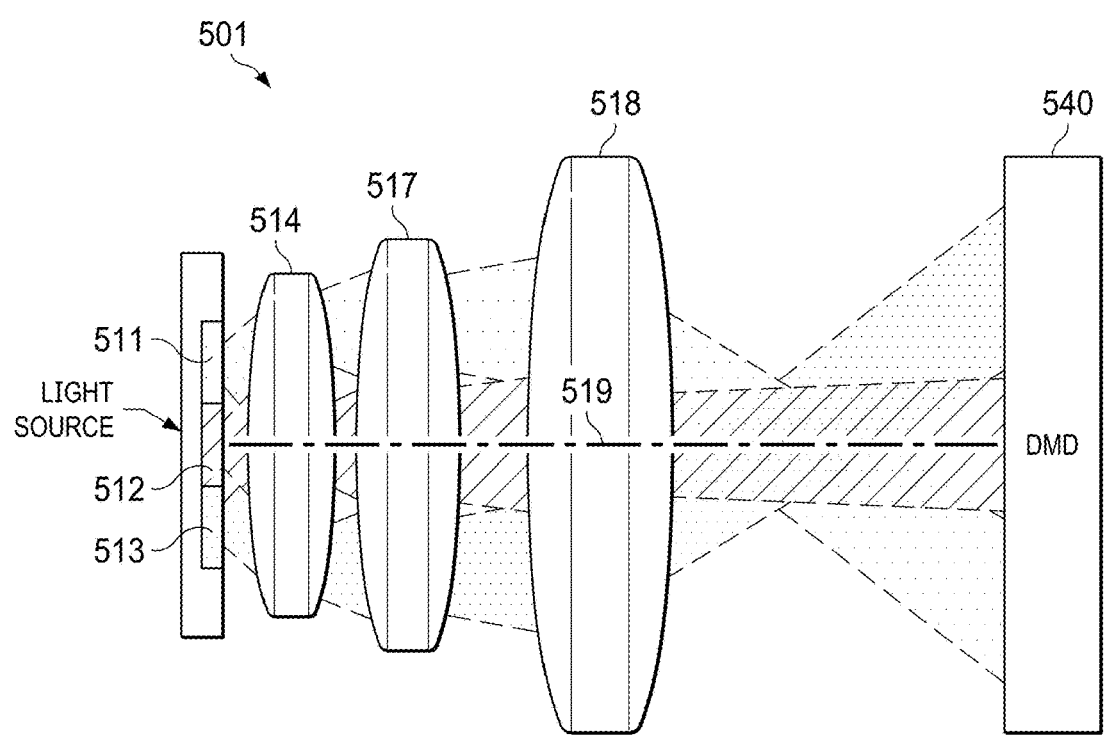
FIG. 5A is a diagram of a system for illuminating a DMD with non-overlapping beam generation from multiple light sources.

FIG. 5A is a diagram of a system for illuminating a DMD with non-overlapping beam generation from multiple light sources. For example, system 501 includes multiple light sources 511, 512 and 513, lenses 514, 517 and 518, and a DMD 540 aligned in accordance with an axis 519 extending from the middle light source 512 to the center point on the optically active surface of the DMD 540.

In operation, the multiple light sources 511, 512 and 513 (right, center and left, respectively) are arranged to generate light for illuminating the optically active surface of the DMD 540. The lenses 514, 517 and 518 are aligned along the axis 519 and are arranged to focus the light sourced by the multiple light sources 511, 512 and 513 on the optically active surface of the DMD 540. The light incident on the optically active surface of the DMD 540 can be uniformly or non-uniformly distributed. When the DMD 540 is uniformly distributed, light sourced from different light sources does not substantially overlap (e.g., by more than a few pixels) on the optically active surface of the DMD 540. When the DMD 540 is non-uniformly distributed, light from different light sources can be partially overlapped. Accordingly, the system 501 can be beam steered by source-modulating either of light source 511 or light source 513 when the DMD 540 is non-uniformly illuminated.

Figure 5B:
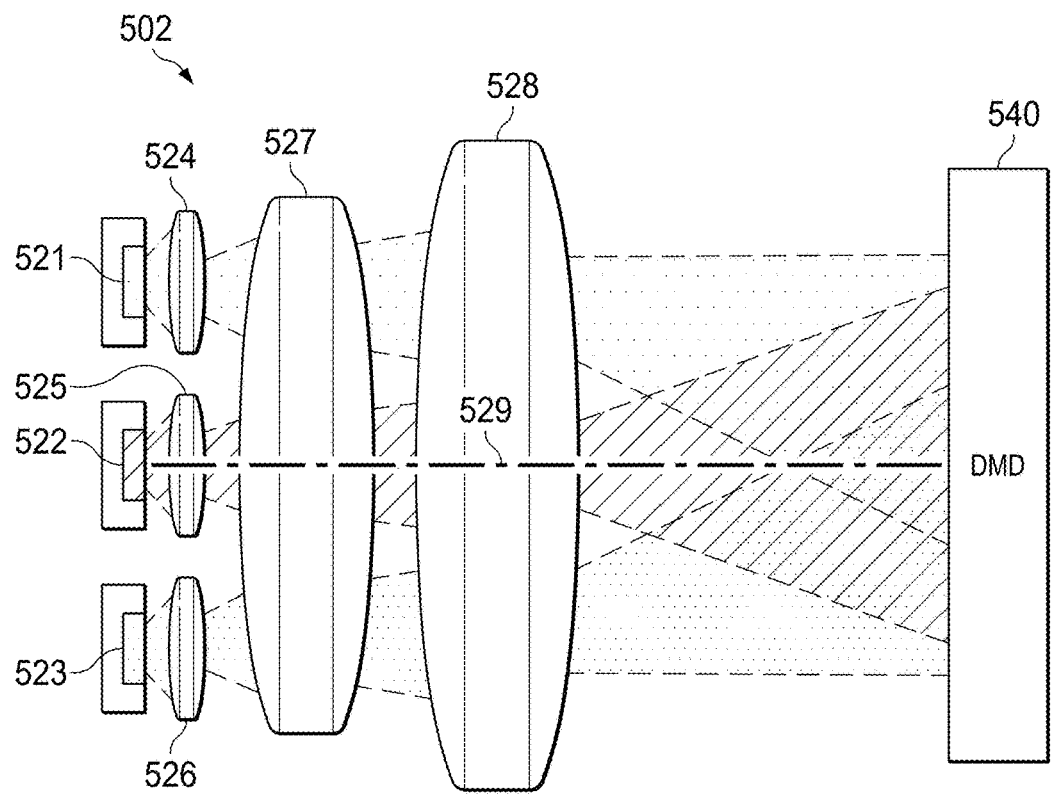
FIG. 5B is a diagram of a system for illuminating a DMD with partially overlapping beam generation from multiple light sources.

FIG. 5B is a diagram of a system for illuminating a DMD with partially overlapping beam generation from multiple light sources. For example, system 502 includes multiple light sources 521, 522 and 523, lenses 524, 525, 526, 527 and 528, and a DMD 540 aligned in accordance with an axis 529 extending from the middle light source 522 to the center point on the optically active surface of the DMD 540.

In operation, the light sources 521, 522 and 523 (right, center and left, respectively) are arranged to generate light for illuminating the optically active surface of the DMD 540. The lenses 524, 525 and 526 are arranged to focus light from respective light sources 521, 522 and 523 upon lens 527. Lenses 527 and 528 are aligned along the axis 529 and are arranged to focus the light sourced by the multiple light sources 521, 522 and 523 on the optically active surface of the DMD 540. The light incident on the optically active surface of the DMD 540 is uniformly distributed, but light sourced from different light sources partially overlaps (e.g., by more than a few pixels) on the optically active surface of the DMD 540. The system 501 can source-modulated beam steered by source-modulating either of light source 521 or light source 523.

Figure 5C:
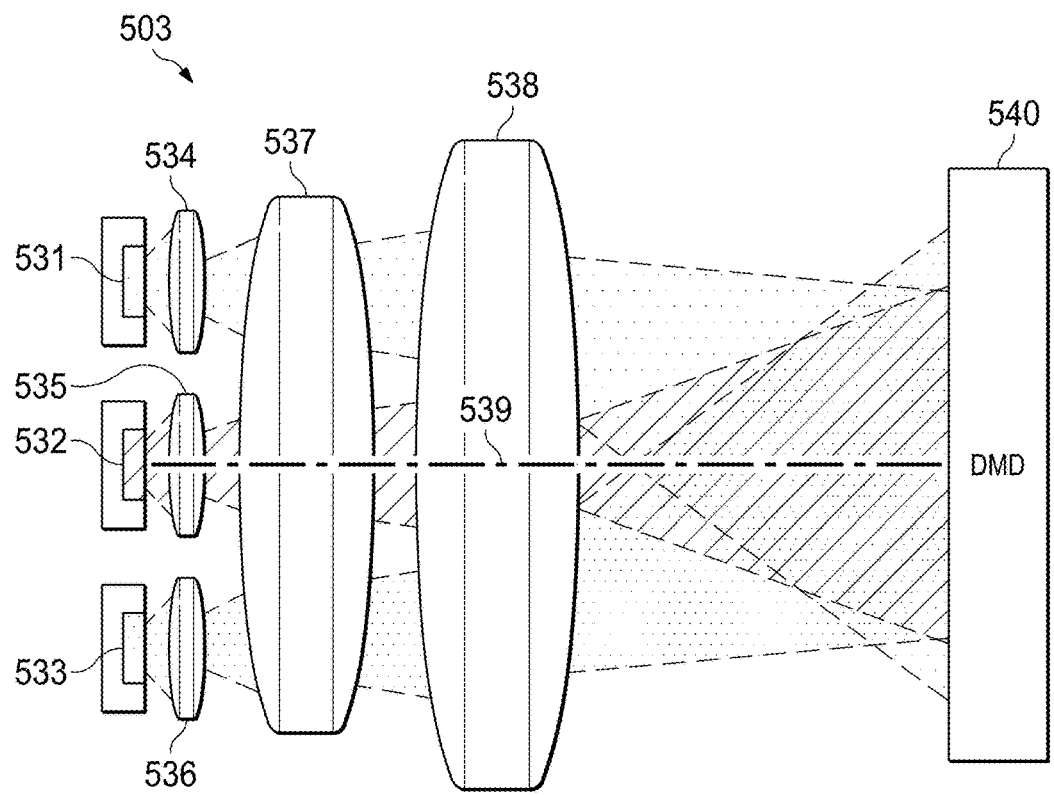
FIG. 5C is a diagram of a system for illuminating a DMD with completely overlapping beam generation from multiple light sources.

FIG. 5C is a diagram of a system for illuminating a DMD with completely overlapping beam generation from multiple light sources. For example, system 503 includes multiple light sources 531, 532 and 533, lenses 534, 535, 536, 537 and 538, and a DMD 540 aligned in accordance with an axis 539 extending from the middle light source 532 to the center point on the optically active surface of the DMD 540.

In operation, the multiple light sources 531, 532 and 533 (right, center and left, respectively) are arranged to generate light for illuminating the optically active surface of the DMD 540. The lenses 534, 535 and 536 are arranged to focus light from light sources 531, 532 and 533, respectively, upon lens 537. Lenses 537 and 538 are aligned along the axis 539 and are arranged to focus the light sourced by the multiple light sources 531, 532 and 533 on the optically active surface of the DMD 540. The light incident on the optically active surface of the DMD 540 is uniformly distributed, but light sourced from different light sources completely overlaps on the optically active surface of the DMD 540. The system 501 can dim the incident light by source-modulating any combination of the light sources 531, 532 and 533.

Figure 6:
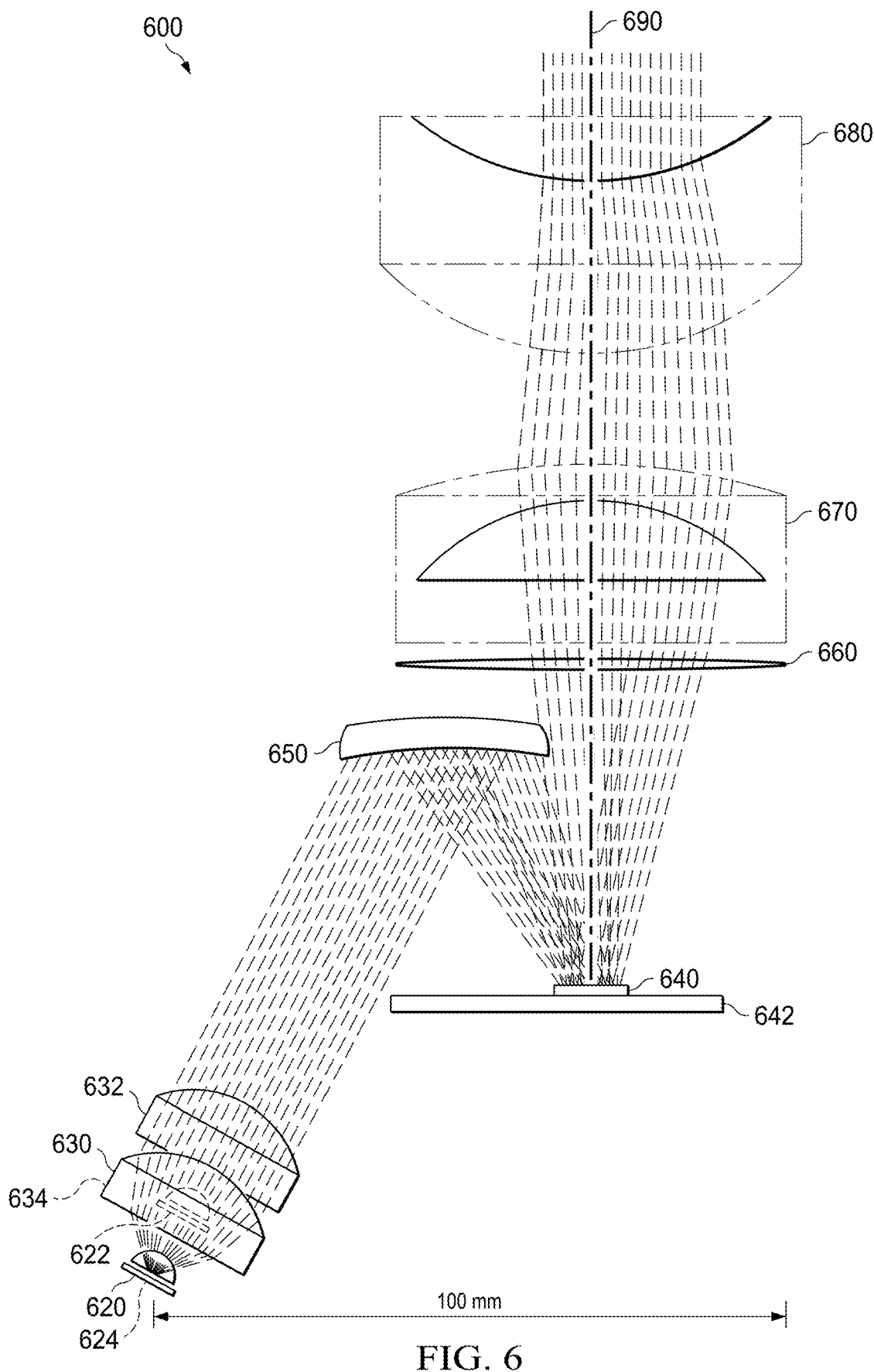
FIG. 6 is a side view of a headlight assembly for source-modulated beam steering with quasi-sparse illumination from same-side light sources.

FIG. 6 is a side view of a headlight assembly for source-modulated beam steering with quasi-sparse illumination from same-side light sources. The headlight assembly 600 generally includes the headlight light sources 620, 622 and 624, a light source lenses 630, 632 and 634, a DMD 640 (affixed to substrate 642), a concave mirror 650, an optional asymmetric aperture 660, a collimating lens 670 and a projection lens 680 for focusing collimated light for projection with respect to an axis 690 (e.g., centered or biased to the left or right and/or upwards or downward of axis 690 as shown in FIG. 1).

As described hereinabove, the light sources 620, 622 and 624 are lamps that are source-modulated independently of one another. The light sources 620, 622 and 624 are arranged to produce light for directional focusing by light source lenses 630, 632 and 634 towards the DMD 640 via the concave mirror 650 (e.g., a biconic mirror for producing asymmetric F-numbers). The light sources 620, 622 and 624 are arranged to produce light (in conjunction with the operation of concave mirror 650), so the DMD is generally uniformly illuminated with partially overlapping beam patterns from the respective light sources. In the example of FIG. 6, the projected beam can be steered by source-modulating the light sources 620 and 624 (independently of one another) and by spatial light modulation using the micromirrors of the DMD 640. The projected light beam (as shown in cross section exiting the projection lens 680) is centered to the right of the axis of projection 690.

The headlight light sources 620, 622 and 624 the light source lenses 630, 632 and 634 are arranged below (e.g., subjacent to) the DMD 640 (as mounted on substrate 642) and on the same side as the concave mirror 650, where the concave mirror is arranged above the DMD 640 for illuminating (e.g., directly illuminating) the optically active surface of the DMD 640.

Figure 7:
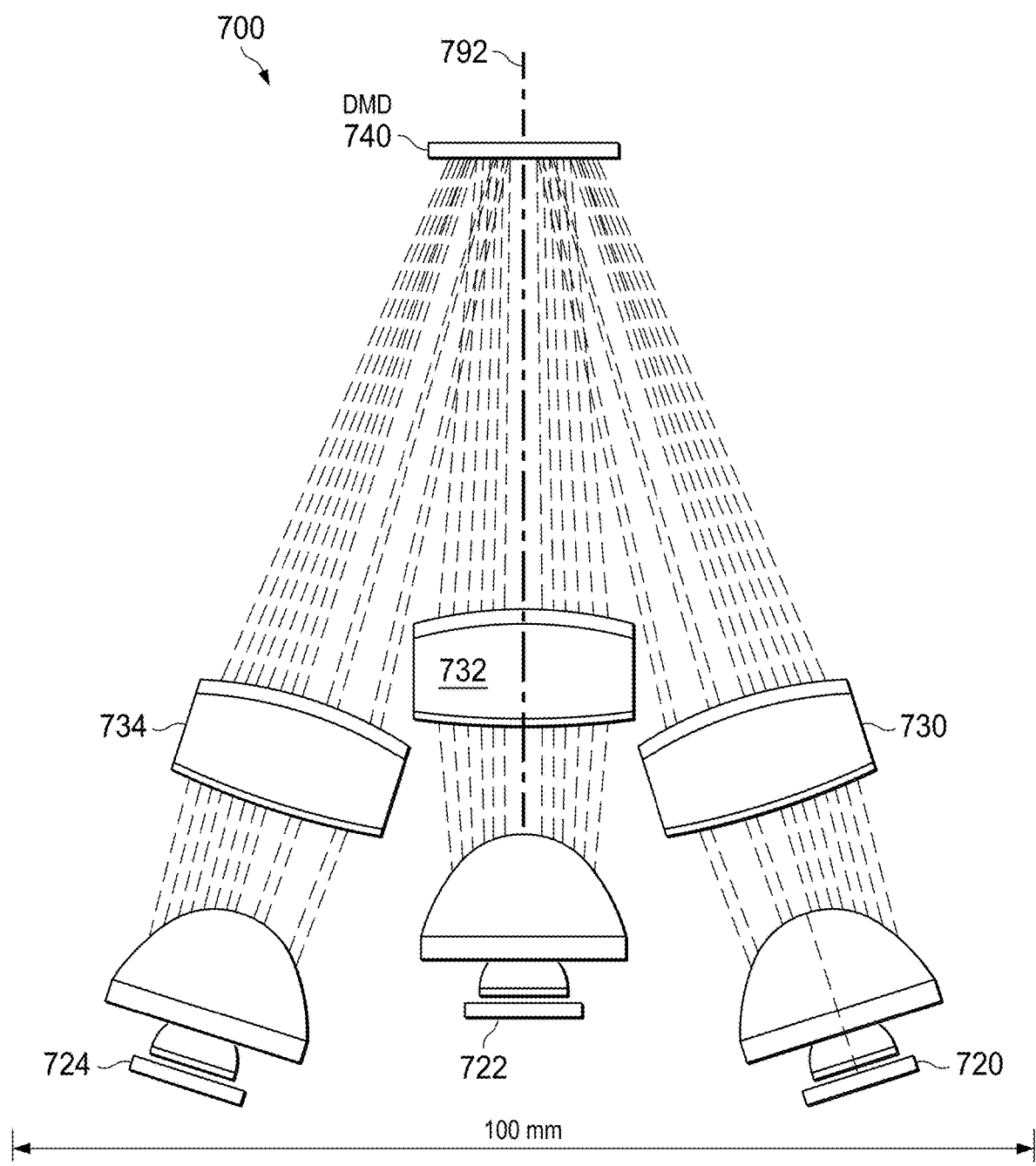
FIG. 7 is a diagram of multiple collection lenses for independently situated and oriented light sources, for partially overlapping beam generation for illuminating a DMD.

FIG. 7 is a diagram of multiple collection lenses for independently situated and oriented light sources, for partially overlapping beam generation for illuminating a DMD. For example, system 700 includes multiple light sources 720, 722 and 724, collection lenses 730, 732 and 734 and a DMD 740 aligned in accordance with an axis 792 extending from the middle light source 722, through the center of the collection lens 732 and to the center point on the optically active surface of the DMD 740. Each of the light sources 720, 722 and 724 can be shifted laterally (e.g., parallel to the plane of the DMD 740) and tilted (e.g., gimbaled) to point towards the DMD 740. Accordingly, each of the light sources 720, 722 and 724 is tilted, so an axis of projection for each light source points towards the micromirrors of the DMD. The light sources 720, 722 and 724 are arranged to respectively illuminate the optical surface of the DMD 740 with partially overlapping beams (e.g., as described hereinabove in connection with FIG. 3).

In operation, the multiple light sources 720, 722 and 724 (right, center and left, respectively) are arranged to generate source-modulated light for illuminating the optically active surface of the DMD 740. The collection lenses 730, 732 and 734 are arranged to focus light from light sources 720, 722 and 724, respectively, upon the optically active surface of the DMD 740: the beams of light refracted by collection lenses 734 and 732 partially overlap when illuminating a left-to-center portion of the optically active surface of the DMD 740 and the beams of light refracted by collection lenses 732 and 730 partially overlap when illuminating a center-to-right portion of the optically active surface of the DMD 740. Accordingly, the system 700 is arranged to electronically steer an optical beam responsive to the source modulation (e.g., of light source 720 or 724) and/or controlling micromirrors of the DMD 740.

Figure 8:
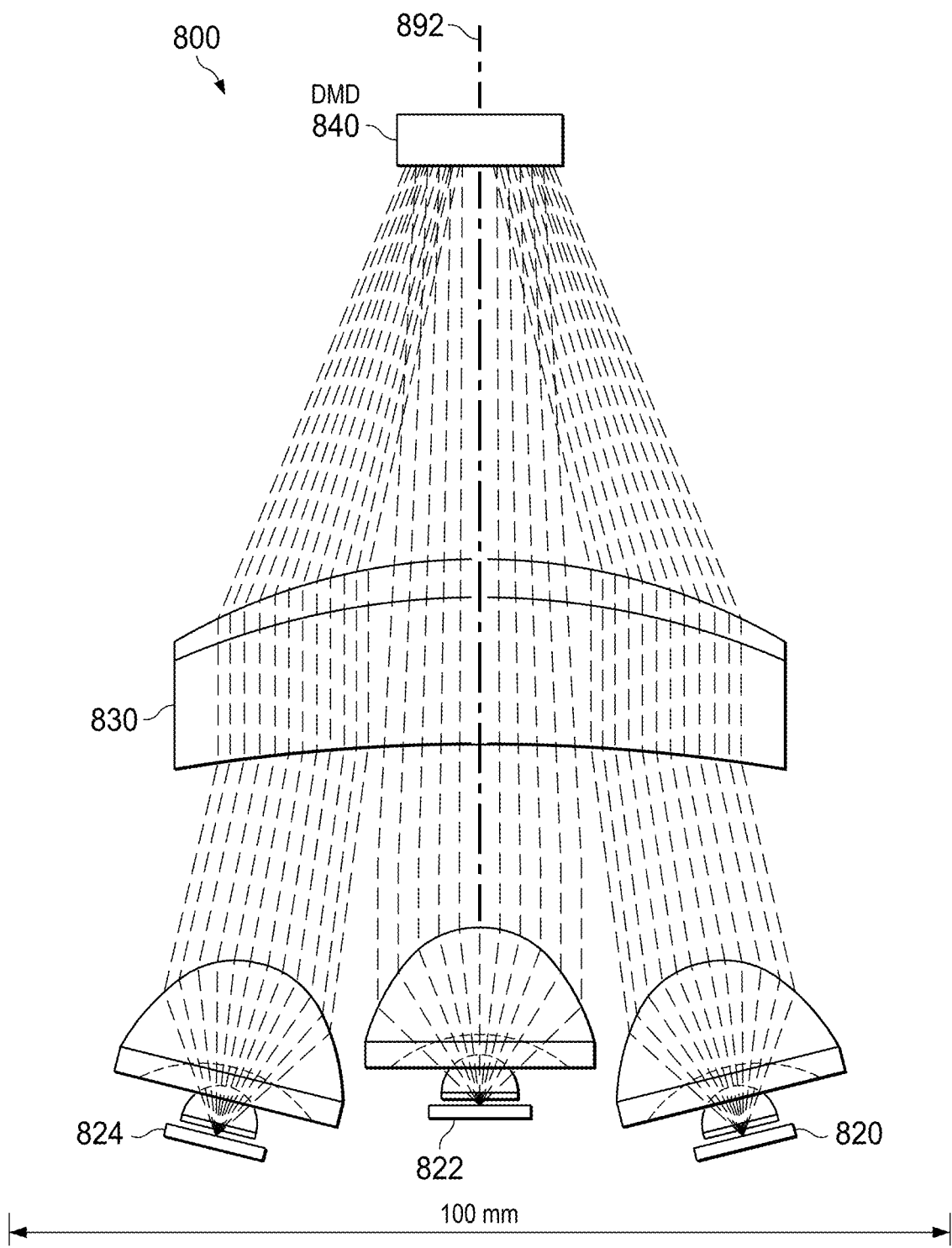
FIG. 8 is a diagram of a single collection lens for independently situated and oriented light sources, for partially overlapping beam generation for illuminating a DMD.

FIG. 8 is a diagram of a single collection lens for independently situated and oriented light sources, for partially overlapping beam generation for illuminating a DMD. For example, system 800 includes multiple light sources 820, 822 and 824, a collection lens 830 and a DMD 840 aligned in accordance with an axis 892 extending from the middle light source 822, through the center of the collection lens 830 and to the center point on the optically active surface of the DMD 840. Each of the light sources 820, 822 and 824 can be shifted laterally (e.g., parallel to the plane of the DMD 840) and tilted (e.g., gimbaled), so an axis of projection for each light source points towards the DMD 840.

The light sources 820, 822 and 824 are arranged to respectively illuminate the optical surface of the DMD 840 with partially overlapping beams (e.g., as described hereinabove in connection with FIG. 3) as lensed by the collection lens 830. The collection lens 830 is a single beam-forming lens for combining (e.g., focusing) beams on the optically active surface of the DMD 840. The collection lens 830 can be biconic or radially symmetrical.

In operation, the multiple light sources 820, 822 and 824 (right, center and left, respectively) are arranged to generate source-modulated light for illuminating the optically active surface of the DMD 840. The collection lenses 830, 832 and 834 are arranged to focus light from light sources 820, 822 and 824, respectively, upon the optically active surface of the DMD 840: the beams of light sourced by the light sources 824 and 822 partially overlap when illuminating a left-to-center portion of the optically active surface of the DMD 840 and the beams of light sourced by the light sources 822 and 820 partially overlap when illuminating a center-to-right portion of the optically active surface of the DMD 840. Accordingly, the system 800 is arranged to electronically steer an optical beam responsive to the source modulation (e.g., of light source 820 or 824) and/or controlling micromirrors of the DMD 840.

Figure 9:
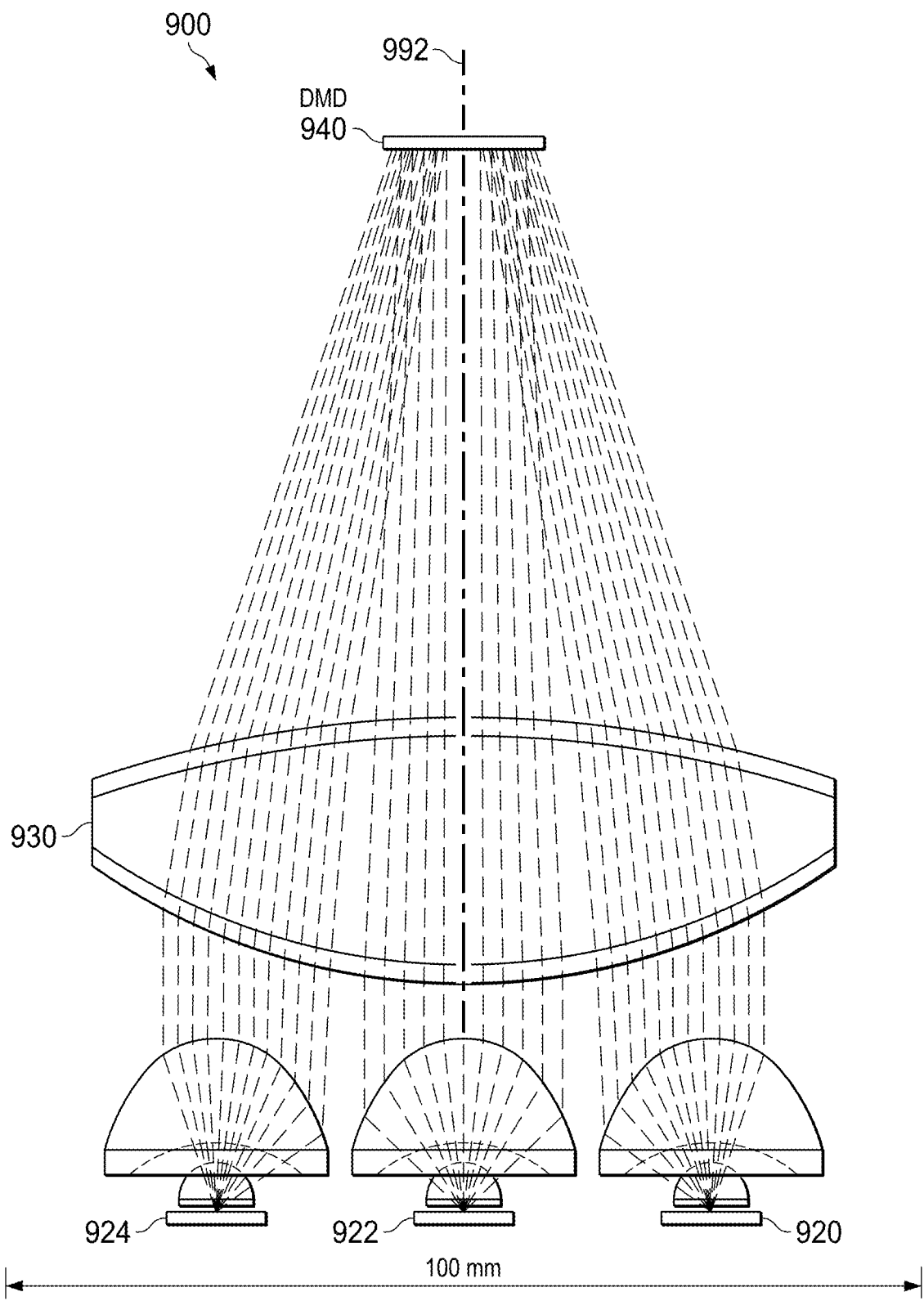
FIG. 9 is a diagram of a single collection lens for planar light sources, for partially overlapping beam generation for illuminating a DMD.

FIG. 9 is a diagram of a single collection lens for planar light sources, for partially overlapping beam generation for illuminating a DMD. For example, system 900 includes multiple light sources 920, 922 and 924, a collection lens 930, and a DMD 940 aligned in accordance with an axis 992 extending from the middle light source 922, through the center of the collection lens 930 and to the center point on the optically active surface of the DMD 940.

The light sources 920, 922 and 924 are arranged in a plane (e.g., parallel to the plane of the DMD 940) for respectively illuminating the optical surface of the DMD 940 with partially overlapping beams (e.g., as described hereinabove in connection with FIG. 3) as lensed by the collection lens 930. The planar arrangement of the light sources 920, 922 and 924 (e.g., same planar arrangement) achieves simpler mechanical layouts and thermal management. The collection lens 930 is a single beam-forming lens for combining beams on the optically active surface of the DMD 940. The collection lens 930 can be biconic or radially symmetrical.

In operation, the multiple light sources 920, 922 and 924 (right, center and left, respectively) are arranged to generate source-modulated light for illuminating the optically active surface of the DMD 940. The collection lenses 930, 932 and 934 are arranged to focus light from light sources 920, 922 and 924, respectively, upon the optically active surface of the DMD 940: the beams of light sourced by the light sources 924 and 922 partially overlap when illuminating a left-to-center portion of the optically active surface of the DMD 940 and the beams of light sourced by the light sources 922 and 920 partially overlap when illuminating a center-to-right portion of the optically active surface of the DMD 940. Accordingly, the system 900 is arranged to electronically steer an optical beam responsive to the source modulation (e.g., of light source 920 or 924) and/or controlling micromirrors of the DMD 940.

Figure 10:
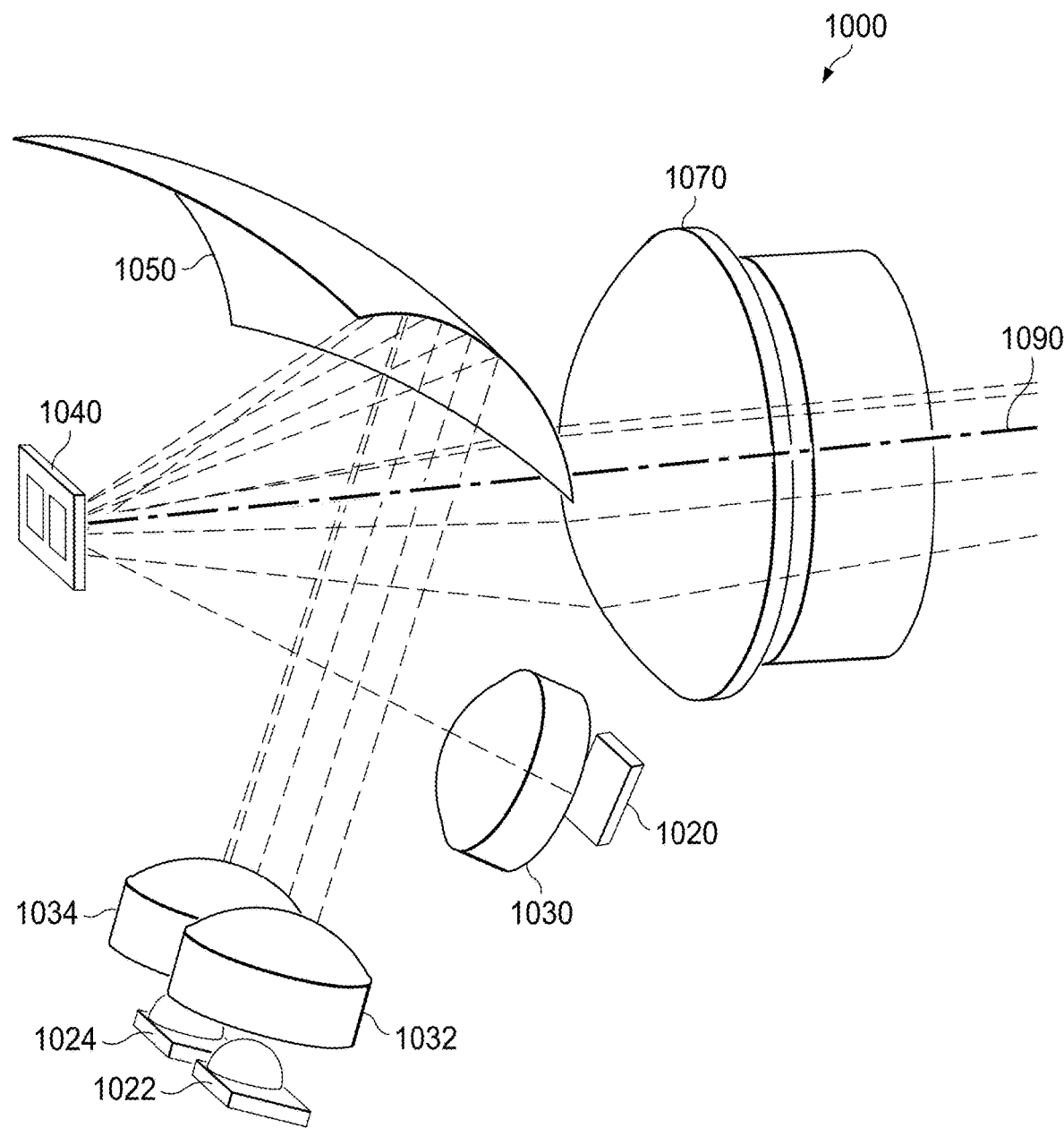
FIG. 10 is a side view of a headlight assembly for beam steering with quasi-sparse illumination from direct and indirect light sources.

FIG. 10 is a side view of a headlight assembly for beam steering with quasi-sparse illumination from direct and indirect light sources. The headlight assembly 1000 generally includes the headlight light sources 1020, 1022 and 1024, light source lenses 1030, 1032 and 1034, a DMD 1040, a concave mirror 1050 and a collimating projection lens 1070 for focusing collimated light for projection with respect to an axis 1090 (e.g., centered or biased to the left or right and/or upwards or downward of axis 1090).

As described hereinabove, the light source 1020, 1022 and 1024 are lamps that are source-modulated independently of one another. The light sources 1022 and 1024 are arranged to produce light for directional focusing by light source lenses 1032 and 1034 along a first DMD illumination path indirectly towards the DMD 1040 via the concave mirror 1050 (e.g., biconic mirror for producing asymmetric F-numbers). The light source 1020 is arranged to produce a light beam for directional focusing by light source lens 1030 along a second DMD illumination path directly towards the DMD 1040. The light sources 1020, 1022 and 1024 are arranged to produce light beams, so the DMD is generally uniformly illuminated with partially overlapping beam patterns from the respective light sources.

In the example of FIG. 10, the DMD and (optionally) the light sources can be duty cycled by source-modulating the light sources 1020 and 1024 (independently of one another) and by cyclically (e.g., at a rate higher than a rate in which the transitions can be noticed by the human eye) tilting the micromirrors of the DMD 1040 back and forth between first and second mirror positions. For example, light from a first light source (e.g., 1020) can be steered into the projection lens when the DMD mirrors are tilted to −12 degrees (tilted down) and steered away from the projection lens when the DMD mirrors are tilted to +12 degrees (tilted up). For a second light source, light from light sources 1022 and/or 1024 can be steered into the projection lens when the DMD mirrors are tilted to +12 degrees (tilted up) and steered away from the projection lens when the DMD mirrors are tilted to −12 degrees (tilted down). The projected light beam (as shown in cross section exiting the collimating projection lens 1070) is centered to the right of the axis of projection 1090. Moreover, duty-cycling of both the light sources and the DMD mirrors increases reliability and lifetimes of both the light sources and the DMD. The frequency of duty-cycling the DMD mirrors and light sources can be selected to avoid perception of flickering, based on the persistence of vision of the human eye.

The outside (left and right) light sources 1022 and 1024 are arranged to indirectly face the DMD 1040 (along a first DMD illumination path), whereas the center light source 1020 is arranged to directly face the DMD 1040 (along a second DMD illumination path). Such an arrangement maintains symmetry for beam steering and helps a smaller optical engine height (e.g., headlight assembly) to be achieved.

Accordingly, illumination architectures are described in which a curved/flat mirror and multiple light sources are located on the opposite ends of DMD. For example, the mirror can be located at the top of the DMD and the multiple light sources located at the bottom of the DMD for a bottom-illuminated device. In another example, For example, the mirror can be located at the right (or left) of the DMD and the multiple light sources located at the left (or right) of the DMD for a side-illuminated device.

Figure 11:
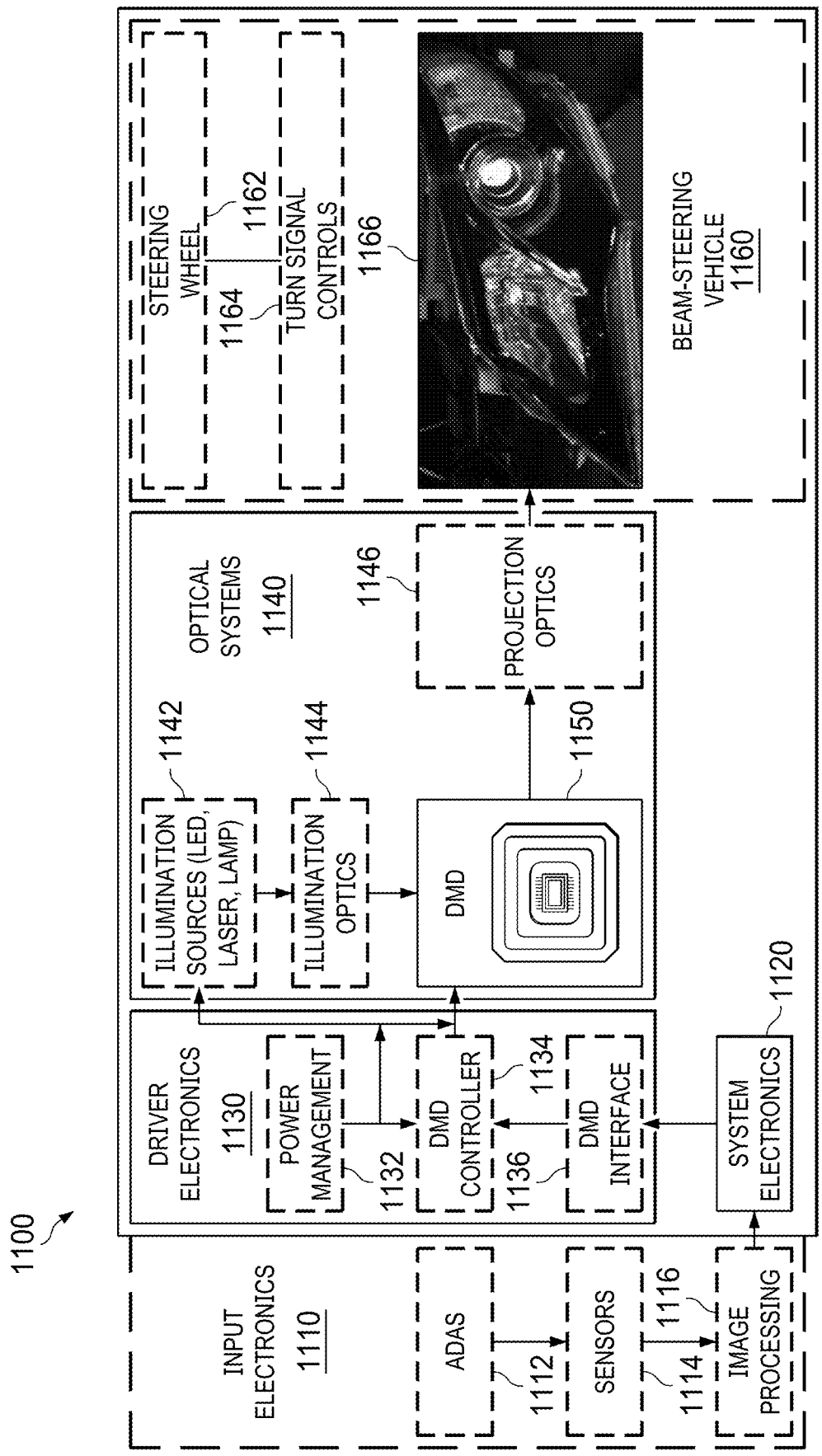
FIG. 11 is a block diagram of a vehicle system for source-modulated beam steering.

FIG. 11 is a block diagram of a vehicle system for source-modulated beam steering. For example, the vehicle system 1100 includes input electronics 1110, system electronics 1120, driver electronics 1130, optical systems 1140 and a beam-steering vehicle 1160. The input electronics 1110 can include an ADAS (advanced drivers assistance system) 1112 suite for sensor-assisted safety augmentation when driving the beam-steering vehicle 1160. The ADAS system is coupled of various sensors 1114 for electronically and/or optically sensing the position of surrounding objects. Examples of the various sensors 1114 include one or more cameras, one or more radars or LIDARs (light detection and ranging), and one or more proximity detectors. Outputs of the various sensors 1114 are processed to generate an electronic representation of the environment surrounding the beam-steering vehicle 1160. For example, a video image from a camera sensor 1114 can be processed by image processing 1116 to determine the presence of pedestrians.

The system electronics 1120 are coupled to receive indications of the electronic representation of the environment surrounding the beam-steering vehicle 1160. The system electronics 1120 is arranged to control the driver electronics 1130. For example, the system electronics can map pixels associated with a pedestrian and ensure that a projected headlight beam illuminates areas around the pedestrian (but not the pedestrian itself, so the pedestrian is shielded against the illumination's potentially blinding effects).

The driver electronics 1130 contain power management 1132 circuitry for selectively applying power to system components in response to operator controls (e.g., 1162 and/or 1164) or in response to an electronic representation of the environment surrounding the beam-steering vehicle 1160. For example, the power management 1132 circuitry is arranged to source-modulate the illumination sources 1142 for source-modulated beam steering. The DMD interface 1136 is responsive to the system electronics and operator controls such as the steering wheel 1162 and turn signal controls 1164 to determine the orientation of micromirrors for the DMD 1150. The DMD controller 1134 is responsive to the power management circuitry 1132 and the DMD interface 1136 to selectively activate the micromirrors of the DMD 1150. For example, the DMD controller 1134 can selectively activate the micromirrors for purposes such as the pedestrian masking and beam steering.

The optical systems 1140 includes illumination sources 1142 (such as LED, lasers and incandescent lamps). Illumination sources 1142 are responsive to the power management 1132 circuitry for source-modulated beam steering in response to a vehicle turning command (e.g., operator control of the steering wheel 1162 and/or operation of turn signal controls 164). For example, the power management 1132 circuitry reduces current to the left and center LEDs during a right turn (e.g., where the left LED can be fully off, and the center LED can be partially off). Similarly, during a left turn, the system reduces current to the right and center LEDs (e.g., where the right LED can be fully off and the center LED can be partially off). Accordingly, the system performs beam steering (e.g., beam shaping) by modulating the light source, in addition to the DMD mirror-based modulation. The reduction of current from modulating the light sources under diverse driving conditions reduces the power consumption of the driver electronics 1130.

The partial overlap of adjacent pairs of beams from adjacent light sources (source-modulated independently of one another) can be used in accordance with multiple purposes. For example, beams from those different light sources are partially overlapped to provide higher peak brightness in the overlapped region and the source-dimmed (e.g., in response to changing road conditions) to help reduce the average power consumption by the light source. Further, adaptive road illumination can be achieved by simultaneously tilting DMD micromirrors for spatial light modulation and modulating source current of those light sources for light source dimming. The described adaptive road illumination includes beam profile steering in response to direction of vehicle turns, brightness adjustment according to vehicle speed, glare reduction for other road users (e.g., in response to optical recognition and/or headlight detection by an optical sensor), communication with other road users (e.g., for conveying position information) and masking (e.g., dimming the light) and marking (e.g., providing at some illumination) pedestrians, animals and road signs to alert the driver without causing glare.

The illumination sources 1142 are coupled to the illumination optics 1144 for focusing incident light on the DMD 1150. The DMD (responsive to the DMD mirror-based modulation and the source-modulated incident light) reflects the incident light into the projection optics 1146 for projection. The optical systems 1142 (and the DMD 1150) are usually included in a headlight assembly 1166, where a front-right corner of the beam-steering vehicle 1160 has a first headlight assembly, and a front-left corner of the beam-steering vehicle 1160 has a second headlight assembly. The projected headlight beams can be beam-steered as described hereinbelow.

Figure 12A:
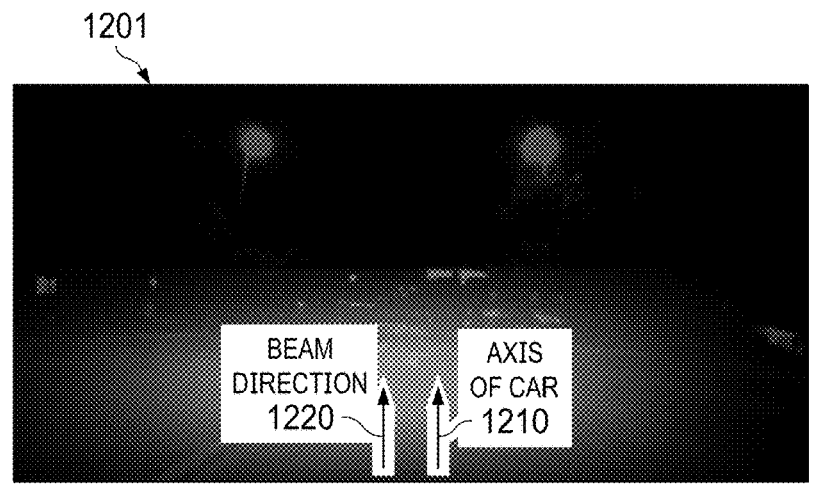
FIG. 12A is a view (from a vehicle) of beam-steering when the vehicle is driving straight ahead.

FIG. 12A is a view (from a vehicle) of beam-steering when the vehicle is driving straight ahead. For example, scenario 1201 shows the axis of a vehicle 1210, which is perpendicular to the front of the vehicle (and points directly ahead of the vehicle at all times). When the vehicle is traveling directly forward (e.g., straight ahead) the beam-direction (of a beam-steering capable beam) is parallel to the axis of the vehicle 1210.

Figure 12B:
FIG. 12B is a view (from a vehicle) of beam-steering when the vehicle is making a shallow turn.

FIG. 12B is a view (from a vehicle) of beam-steering when the vehicle is making a shallow turn. For example, scenario 1202 shows the axis of a vehicle 1210, which is perpendicular to the front of the car. When the vehicle is in the shallow turn to the left, the beam-direction (of a beam-steering capable beam) is steered to the left of the axis of the vehicle 1210. As the vehicle is in the shallow turn to the left, pedestrians 1230 on a street corner are detected by a camera sensor and the image processed to determine the relative location of the pedestrians 1230 to the beam projected along the beam direction 1220. When the relative location of the pedestrians 1230 is in the path of the beam (such that the pedestrians 1230 would otherwise be illuminated by the beam), the pixel rays intersecting the relative location of the pedestrians 1230 are masked (e.g., by reducing the illumination fully or partially by controlling DMD micromirrors associated with the masked pixels).

Figure 12C:
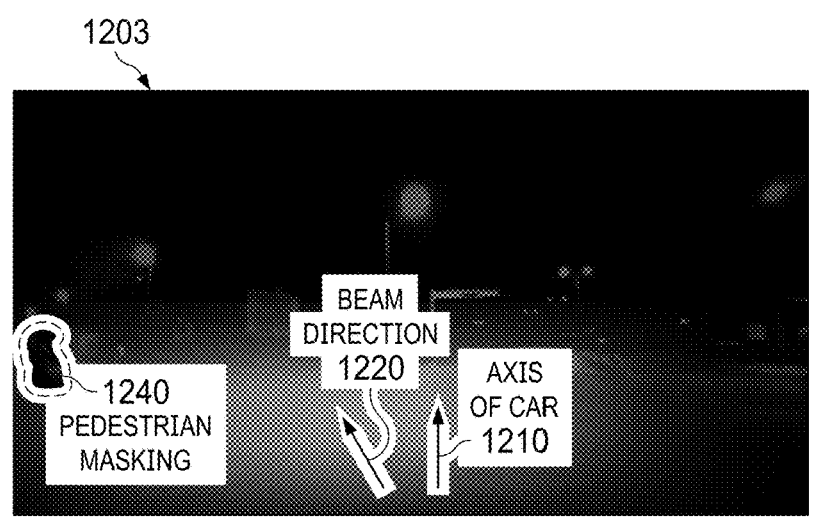
FIG. 12C is a view (from a vehicle) of beam-steering when the vehicle is making a sharper turn.

FIG. 12C is a view (from a vehicle) of beam-steering when the vehicle is making a sharper turn. For example, scenario 1203 shows the axis of a vehicle 1210, which is perpendicular to the front of the car. When the vehicle is in the sharper turn to the left (e.g., having a turn radius less than the turn radius of the shallow turn in scenario 1202), the beam-direction is steered more sharply to the left of the axis of the vehicle 1210. As the vehicle is in the sharper turn to the left, the pedestrians 1230 are pedestrian masked 1240 from illumination on a street corner are detected by a camera sensor and image processing.

In at least one example, a first light source can be optionally dimmed in response to an indication of a driving condition, so power is conserved, and a projected beam can be effectively steered away from a location associated with the indicated driving condition Modifications are possible in the described embodiments, and other embodiments are possible, within the scope of the claims.

What is claimed is:

1. A vehicle comprising:
   a digital micromirror device (DMD) comprising micromirrors;
   a first light source optically coupled to the micromirrors, the first light source configured to produce a first modulated beam to illuminate at least a first portion of the micromirrors in response to a first control signal;
   a second light source optically coupled to the micromirrors, the second light source configured to produce a second modulated beam to illuminate at least a second portion of the micromirrors in response to a second control signal, the second modulated beam at least partially overlapping with the first modulated beam at the micromirrors; and
   driver electronics configured to receive a vehicle signal indicating a condition of the vehicle, the driver electronics comprising a controller configured to send a control signal to the first light source and to the second light source in response to with the vehicle signal.

2. The vehicle of claim 1, wherein the control signal instructs at least some of the micromirrors to change orientation.

3. The vehicle of claim 1, wherein the control signal instructs the first light source to change brightness.

4. The vehicle of claim 1, wherein the micromirrors are configured to cycle between first positions and second positions.

5. The vehicle of claim 1, wherein the first light source is configured to modulate the first modulated beam and the second light source is configured to independently modulate the second modulated beam.

6. The vehicle of claim 1, further comprising a projection lens optically coupled to the DMD, wherein the micromirrors are configured to reflect at least a portion of the first modulated beam to the projection lens as a first reflected beam and to reflect at least a portion of the second modulated beam to the projection lens as a second reflected beam, and the projection lens is configured to generate a headlight beam based on the first reflected beam and the second reflected beam.

7. An apparatus comprising:
    driver electronics having a driver input and a driver output, the driver input configured to receive a vehicle signal indicating a condition of a vehicle, the driver output adapted to be coupled to an optical system, the driver electronics comprising a controller configured to produce a control signal at the driver output in response to the vehicle signal, the control signal instructing the optical system to:
        modulate a first light source of a headlamp to produce a first light beam; and
        modulate a second light source of the headlamp independently of the first light source to produce a second light beam, so the first light beam and the second light beam partially overlap.

8. The apparatus of claim 7, further comprising input electronics comprising an output, the output of the input electronics coupled to the driver input.

9. The apparatus of claim 8, wherein the input electronics comprises sensors configured to generate the vehicle signal.

10. The apparatus of claim 9, wherein the sensors comprise a LiDAR sensor, a radar sensor, a camera, or a proximity detector.

11. The apparatus of claim 10, further comprising system electronics coupled to the input electronics and to the driver electronics, the system electronics configured to steer the first light beam and the second light beam to avoid illuminating a pedestrian and to illuminate areas around the pedestrian.

12. The apparatus of claim 7, wherein the driver electronics comprises power management circuitry comprising:
    a power management input configured to receive an input signal; and
    a power management output coupled to the driver input, the power management circuitry configured to generate a signal to apply power to at least one of the first light source or the second light source, in response to the input signal.

13. The apparatus of claim 7, wherein the vehicle signal is received from a steering wheel or a turn signal control.

14. The apparatus of claim 7, wherein the driver electronics comprises a digital micromirror device (DMD) controller comprising:
    a DMD controller input configured to receive an input signal; and
    a DMD controller output coupled to the driver input, the DMD controller configured to generate a signal to selectively activate micromirrors in a DMD, in response to the input signal.

15. The apparatus of claim 7, wherein the vehicle signal comprises global positioning system (GPS) data.

16. The apparatus of claim 7, wherein the vehicle signal comprises a vehicle speed or a signal received from a second vehicle.

17. A headlamp comprising:
    a digital micromirror device (DMD) comprising micromirrors;
    a first light source optically coupled to the micromirrors, the first light source configured to produce a first modulated beam to illuminate at least a first portion of the micromirrors in response to a first control signal; and
    a second light source optically coupled to the micromirrors, the second light source configured to produce a second modulated beam to illuminate at least a second portion of the micromirrors in response to a second control signal, the second modulated beam at least partially overlapping the first modulated beam at the micromirrors.

18. The headlamp of claim 17, further comprising:
    a convex lens optically coupled to the first light source; and
    a concave mirror optically coupled between the convex lens and the micromirrors.

19. The headlamp of claim 17, further comprising a collection lens coupled between the first light source and the DMD.

* * * * *